C. BOZILE.
CORN SHELLER.
APPLICATION FILED MAR. 24, 1911.
1,016,471.
Patented Feb. 6, 1912.
2 SHEETS—SHEET 1.
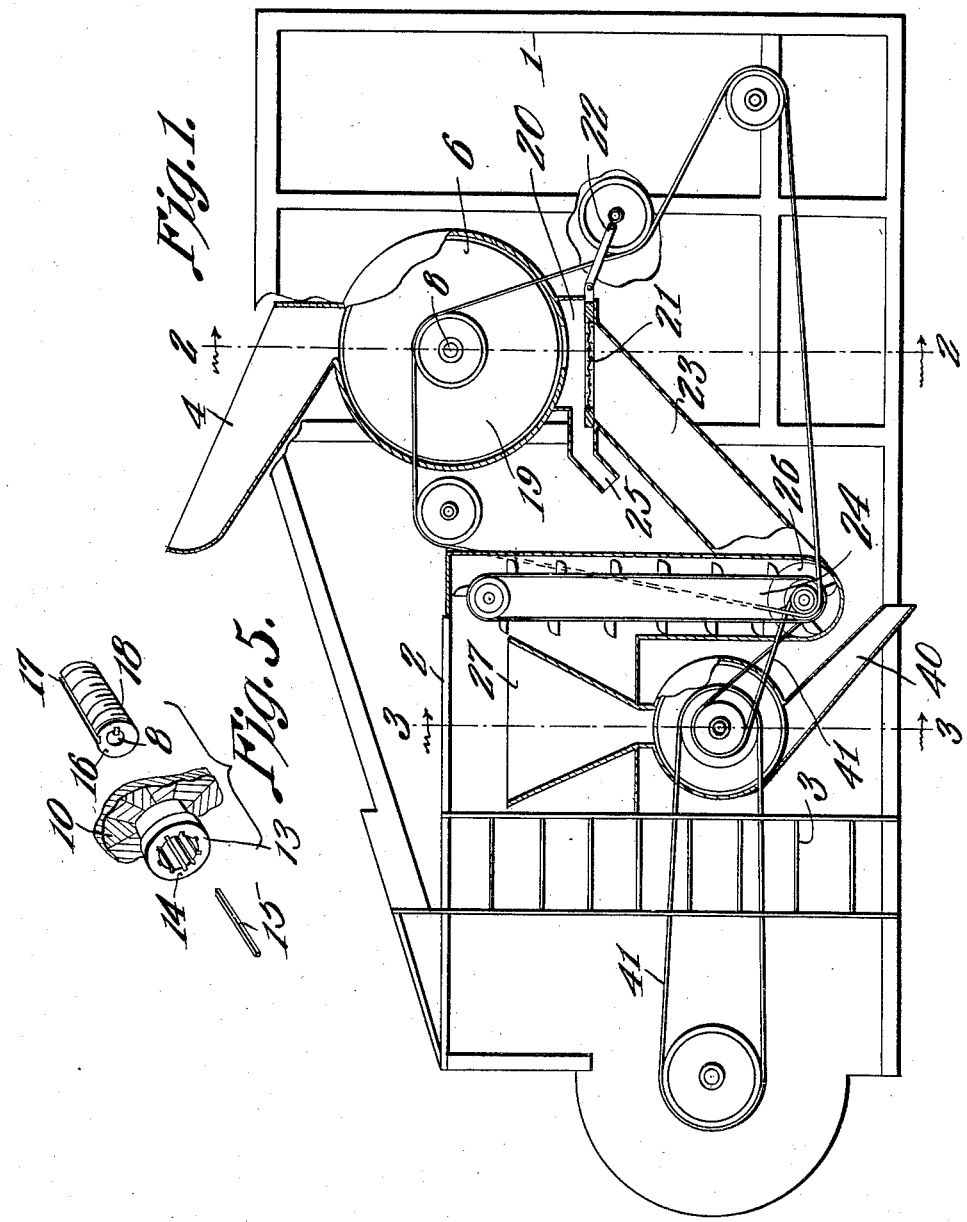
Witnesses
Charles Bozile,
Inventor
by C. A. Snow & Co.
Attorneys C. BOZILE.
CORN SHELLER.
APPLICATION FILED MAR. 24, 1911.
1,016,471. Patented Feb. 6, 1912.
2 SHEETS—SHEET 2.
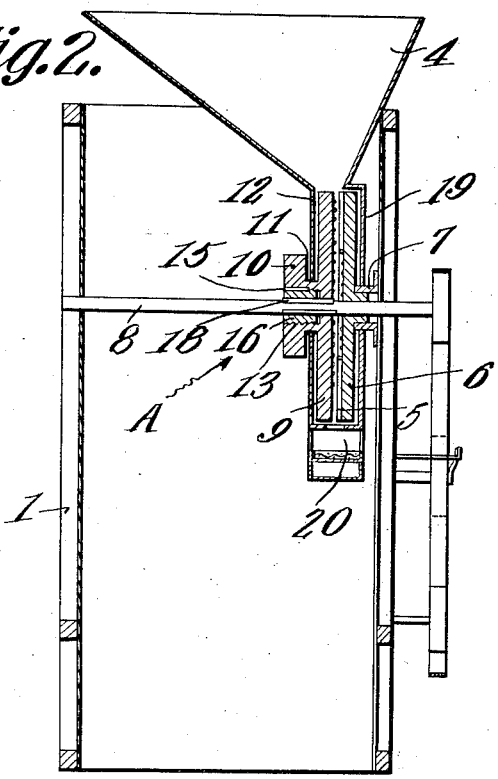
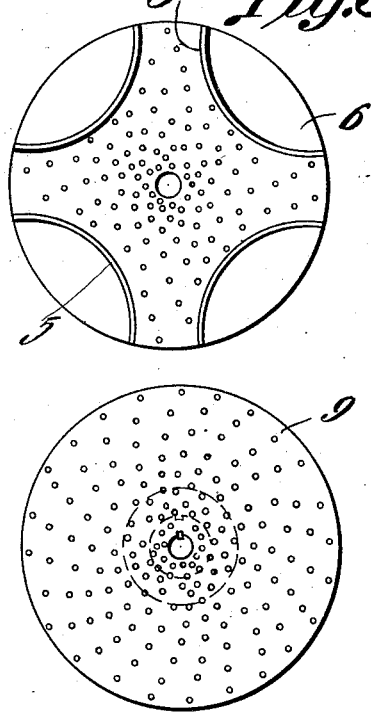
Charles Bozile,
Inventor

UNITED STATES PATENT OFFICE.

CHARLES BOZILE, OF MANAWA, WISCONSIN.

CORN-SHELLER.

1,016,471.  Specification of Letters Patent.  Patented Feb. 6, 1912.

Application filed March 24, 1911. Serial No. 616,623.

*To all whom it may concern:*

Be it known that I, CHARLES BOZILE, a citizen of the United States, residing at Manawa, in the county of Waupaca and State of Wisconsin, have invented a new and useful Corn-Sheller, of which the following is a specification.

This invention relates to corn shellers of that class employing a rotary disk, and the object of the same is to improve the construction of machines of this character.

The following specification describes my invention in detail, reference being had to the accompanying drawings in which—

Figure 1 is a general side elevation of the machine, parts being broken away. Fig. 2 is a vertical section on the line 2—2 of Fig. 1. Figs. 3 and 4 are face views of the disks for shelling the corn. Fig. 5 is a perspective detail of parts taken from about the viewpoint indicated by the arrow A in Fig. 2.

In the drawings, the numeral 1 designates as a whole the framework of this machine, including a platform 2 on which the operator stands and the ladder 3 by which he climbs onto the platform, and 4 is the main hopper into which the corn is fed. Passing out of the lower end of this hopper, the corn passes between stationary ribs 5 on the fixed disk 6 which is held by brackets 7 on the framework around the shaft 8, and falls between the spudded grinding surface of this disk and the similar adjacent surface of the rotating disk 9 shown in Fig. 5. The ribs 5 which are of arcuate shape are disposed around the periphery of the disk with their convex sides disposed inwardly, and the ends thereof spaced apart, one of the spaces between the ends of two adjacent ribs being disposed toward the hopper to receive the material. When the material passes between the two disks, the same is confined within the ribs and is subject to an agitated grinding action therebetween for the reason that the motion of the rotary disk moves the material between the disk outward and the ribs direct the same inward, thus forcing the ears of corn for reciprocatory radial movements as the rotary disk is in action. Said rotating disk has a hub 10 which is grooved as at 11 for the reception of the spout 12 at the lower end of the hopper 4, and through this hub is a threaded hole 13 surrounded by several axial notches 14.

Keyed as at 15 to the shaft 8 is a bushing 16 threaded on its exterior and provided with a longitudinal groove 17. The hub of the rotary disk 9 is screwed upon this bushing (the latter remaining fixed upon and keyed to the shaft 8) until the active face of the disk is as near as desired to the active face of the fixed disk, and when one of the notches or grooves 14 comes into register with the groove 17 in the bushing, a key 18 is driven into them to prevent the hub from unscrewing from the bushing. This affords means for adjusting the rotary disk toward or from the fixed disk so as to set them for shelling corn of any variety. The right hand side of the spout 12, indicated by the numeral 19, passes behind the fixed disk 6 and around the brackets 7 as best seen in Fig. 2, and the kernels of corn and the cobs from which they have been shelled fall from between these disks in a manner which will be clear.

At the lower end of the casing 12—19, is a chamber 20 whose bottom is formed by a sieve 21 which is reciprocated by suitable mechanism indicated at 22 so that only the finer particles falling into this chamber can pass down the chute 23 to the elevator 24, whereas the coarser particles pass out of this chamber 20 through its spout 25. A worm 26 connects the lower end of the chute 23 with the lower end of the elevator 24, while the upper end of the latter delivers into a hopper. This hopper leads to the feed-grinding mechanism, not necessary to be described.

The operator climbs the ladder 23 and takes a position on the platform 2, feeding the corn into the hopper 4 whence it falls into the casing or housing 12—19, and the kernels are taken off the cob between the disks 6 and 9. If these are set far enough apart, the cobs will not be crushed, but will be delivered whole out of the spout 25, if these disks are set a little closer together the cob will be crushed into rather large pieces which may be delivered out of said spout if the sieve 21 is sufficiently fine or may be passed through said sieve by inserting one of coarse mesh, and if the disks are set quite close to each other the cob will be ground up at the time the corn kernels are taken off of it and both kernels and pieces of cob will be passed through the sieve and into the chute 23. Whatever falls into the latter is, however, picked up by the elevator 24 and carried upward and delivered into the hopper 27.

The spout 25 which delivers pieces of husks and other extraneous matter can be directed to the interior of the framework or through it to the rear so that this refuse will not be confused with the corn which is taken from the cobs or with the ground up cobs or feed.

All parts are of the desired sizes, shapes, materials, and detailed construction; and various changes in the immaterial features may be made without departing from the principle of my invention.

What is claimed is:

1. In a machine of the class described, the combination of a pair of disks having opposed active faces, one of the disks having a rotary movement relative to the other, and one of the disks being provided with a plurality of ribs on the active face thereof for directing the material between the disks inward, thus subjecting the material to reciprocatory radial movements.

2. In a machine of the class described, the combination with a housing and a rotary shaft passing therethrough, of a rotating disk mounted upon the said shaft and inclosed within the said housing, and a fixed disk mounted within the housing having the active face thereof opposing that of the rotary disk, one of the said disks having a plurality of arcuate ribs projecting therefrom around its periphery, the convex sides of the ribs being disposed inwardly whereby the material fed between the said disks is subjected to an agitated grinding action between the said ribs.

3. In a machine of the class described, the combination with a hopper whose spout forms a housing, a rotary shaft through the latter, and a rotating disk mounted upon said shaft and inclosed within said housing; of a fixed disk also mounted within said housing, the active face of this disk opposing that of the rotary disk and having around its periphery a plurality of arcuate ribs projecting therefrom, the convex sides of the ribs being disposed inwardly and the ends thereof being spaced apart, one of the spaces between the ends of the ribs being disposed toward the hopper to receive the material, whereby the material is confined within the ribs and subjected to an agitated grinding action therebetween.

In testimony that I claim the foregoing as my own, I have hereto affixed my signature in the presence of two witnesses.

CHARLES BOZILE.

Witnesses:
C. D. DICK,
J. C. KINSMAN.